United States Patent
Murata

[19]

[11] Patent Number: 5,876,306
[45] Date of Patent: Mar. 2, 1999

[54] CONTROL SYSTEM FOR AN AUTOMATIC TRANSMISSION CLUTCH IN AN ENGINE STARTING OPERATION

[75] Inventor: Kiyohito Murata, Susono, Japan

[73] Assignee: Toyota Jidosha Kabushiki Kaisha, Toyota, Japan

[21] Appl. No.: 807,631

[22] Filed: Feb. 27, 1997

[30]     Foreign Application Priority Data

Feb. 29, 1996  [JP]  Japan ................................. 8-043132

[51] Int. Cl.$^6$ ........................... F16F 15/22; B60K 41/22
[52] U.S. Cl. ..................... 477/175; 477/97; 192/103 F
[58] Field of Search ............................ 477/70, 71, 74, 477/97, 166, 170, 171, 172, 174, 175, 167, 67; 192/103 F, 103 FA, 105 F; 701/54, 66, 67, 68

[56]           References Cited

U.S. PATENT DOCUMENTS

| | | | |
|---|---|---|---|
| 3,926,074 | 12/1975 | Sugahara | 464/28 |
| 4,688,665 | 8/1987 | Rowen | 192/103 F X |
| 5,695,032 | 12/1997 | Murata et al. | 192/213.1 X |
| 5,725,456 | 3/1998 | Fischer et al. | 477/174 |

FOREIGN PATENT DOCUMENTS

| | | |
|---|---|---|
| 61-14233 | 1/1986 | Japan. |
| 4-165149 | 6/1992 | Japan. |
| 5-296338 | 11/1993 | Japan. |
| 2 293 633 | 4/1996 | United Kingdom. |

OTHER PUBLICATIONS

Patent Abstracts of Japan, vol. 016, No. 464, Sep. 28, 1992, JP-A-04 165149, Jun. 10, 1992.

*Primary Examiner*—Charles A. Marmor
*Assistant Examiner*—Ankur Parekh
*Attorney, Agent, or Firm*—Oblon, Spivak, McClelland, Maier & Neustadt, P.C.

[57]           ABSTRACT

In the control system of an automatic transmission for a motor vehicle wherein power delivered from an engine is transmitted to a gear shift mechanism through a damper and then transmitted from the gear shift mechanism to driving wheels through a starting clutch, when an engine speed detected by engine speed sensor (in FIG. 1) is not higher than a predetermined value in the engine starting operation, an engageable element (in FIG. 1) constituting the gear shift mechanism is released, and when the engine speed is higher than the predetermined value, the engageable element is brought into engagement, thereby to alter the resonance point of a rotary system including the damper and to prevent the damper from resonating, so that a vibration of large amplitude does not occur in the engine starting operation.

3 Claims, 8 Drawing Sheets

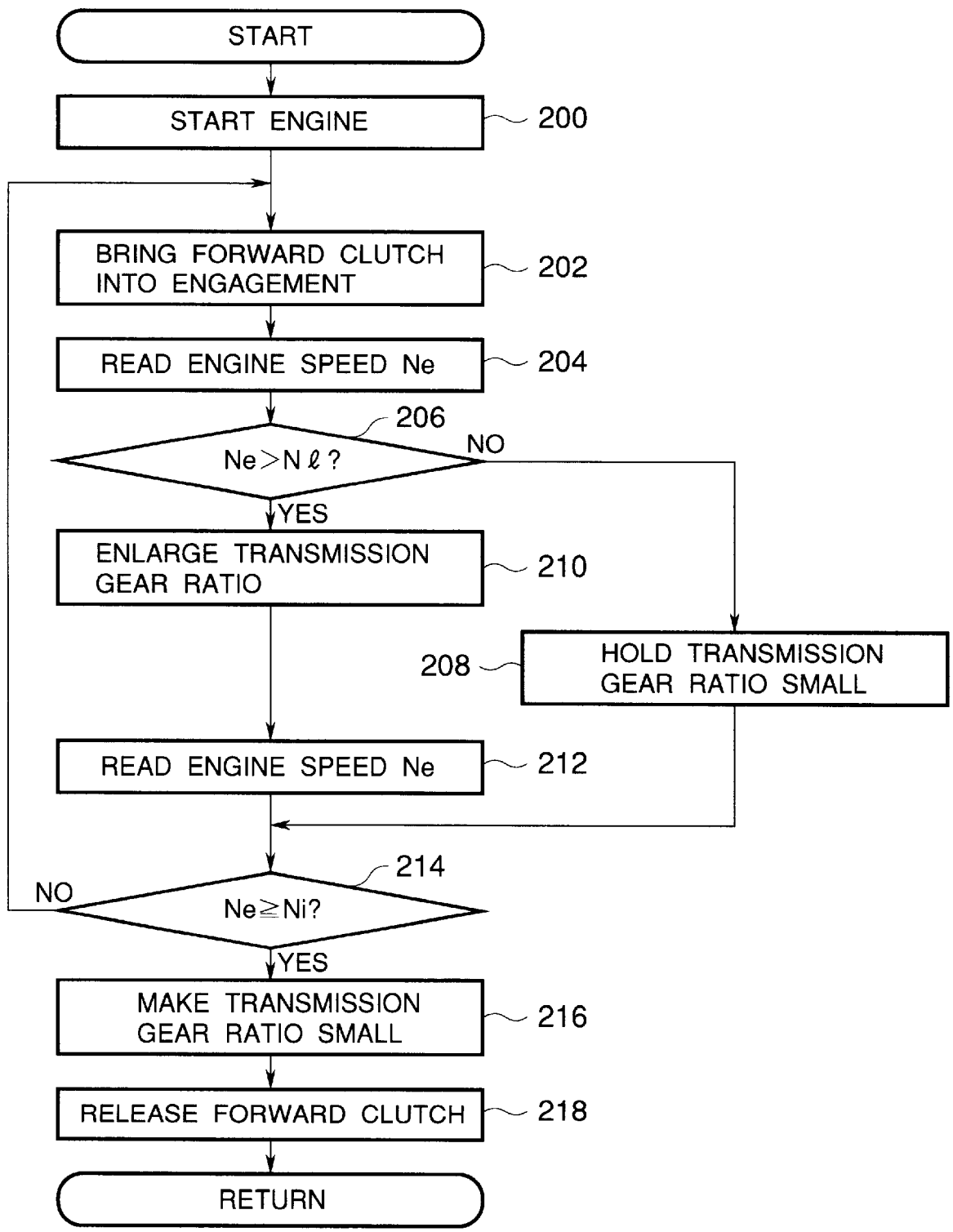

CONTROL SYSTEM FOR AN AUTOMATIC TRANSMISSION CLUTCH IN AN ENGINE STARTING OPERATION

BACKGROUND OF THE INVENTION

1. Field of the Invention

The present invention relates to an automatic transmission for a motor vehicle. More particularly, it relates to the control system of an automatic transmission wherein power delivered from an engine is transmitted to a gear shift mechanism through a damper, and the power is transmitted from the gear shift mechanism to driving wheels through a starting clutch.

2. Description of the Prior Art

There has heretofore been known an automatic transmission of so-called "friction start type" which starts a motor vehicle by bringing a starting clutch into engagement.

By way of example, the official gazette of Japanese Patent Application Laid-open No. 165149/1992 discloses an automatic transmission wherein power delivered from an engine is transmitted through a damper to a gear shift mechanism which consists of a stepless transmission device and planetary gears for switching forward/reverse movements, and the power is transmitted from the gear shift mechanism to driving wheels through a starting clutch.

With the prior-art automatic transmission, the starting clutch should preferably be held in complete or full engagement from the low rotational speed of the engine in order to enhance fuel consumption. It is recommendable for such complete engagement to bestow a small spring constant on the damper for absorbing a torque fluctuation, and to shift the resonance point (namely, resonance frequency) of a system including the damper, into the speed zone of the engine lower than the idling rotational speed thereof.

However, when the damper of the small spring constant is employed in this manner, the rotational speed of the engine traverses the resonance point in the engine starting operation of the motor vehicle. This poses the problem that a vibration of large amplitude takes place in the motor vehicle.

SUMMARY OF THE INVENTION

The present invention has been made in view of the problem of prior art as stated above, and has for its object to provide a control system of an automatic transmission which can prevent a vibration of large amplitude in the engine starting operation of a motor vehicle in spite of permitting a starting clutch to come into complete engagement from the low rotational speed of an engine.

The present invention has achieved the above object by adopting a first aspect of performance, the gist of which is illustrated in FIG. 1A, or a second aspect of performance, the gist of which is illustrated in FIG. 1B.

More specifically, the present invention consists in that, in a gear shift mechanism, the inertial mass or shaft-calculated inertial mass downstream of a damper is altered depending upon an engine speed, so as to shift the resonance point of a system including the damper, thereby to prevent the occurrence of resonance in the engine starting operation of a motor vehicle.

In the first aspect of performance of the present invention, when the engine speed is not higher than a predetermined value, an engageable element constituting the gear shift mechanism is released. Owing to the release, the rotary system downstream of the engageable element of the automatic transmission is prevented from corotating and is therefore prevented from forming the inertial mass downstream of the damper, so that the resonance point of the damper is kept at a higher engine speed (higher than the predetermined value). Accordingly, the engine speed can smoothly rise without the vibration.

On the other hand, when the engine speed has become higher than the predetermined value, the engageable element is brought into engagement this time. Owing to the engagement, the rotary system downstream of the engageable element comes to corotate with the part of the rotary system upstream of this engageable element, and hence, also the members of the downstream side come to form the inertial mass downstream of the damper. As a result, the resonance point of the damper is kept at a lower engine speed (lower than the predetermined value). As in the above, accordingly, the engine speed can smoothly rise still more without the vibration.

Meanwhile, in the second aspect of performance of the present invention, when the engine speed is not higher than a predetermined value, the transmission gear ratio of the gear shift mechanism is set small, and when the engine speed is higher than the predetermined value, the transmission gear ratio of the gear shift mechanism is set large. Even in a case where the mass itself of the members corotating downstream of the damper is equal, the resonance point of the damper varies when the transmission gear ratio of the (corotating) gear shift mechanism is different. The reason therefor is that the shaft-calculated inertial mass downstream of the damper differs in accordance with the different transmission gear ratio.

The second aspect of performance has been made with note taken of the above fact. Herein, the transmission gear ratio of the gear shift mechanism is altered depending upon the engine speed, and the resonance point of the damper is altered in synchronism with the rise of the engine speed as in the first aspect of performance, thereby to suppress the vibration of the rotary system.

As thus far explained, the resonance point is altered depending upon the engine speed. Therefore, in spite of permitting a starting clutch to come into engagement at the early stage of the engine starting operation, the occurrence of the resonance can be suppressed to prevent the vibration of large amplitude from arising.

Incidentally, the gear shift mechanism mentioned here may well be, for example, one which comprises a stepless transmission device and forward/reverse switching gears such as planetary gears, or one which comprises twin clutches having parallel gears. The practicable construction of the gear shift mechanism shall not be especially restricted.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein:

FIG. 7 is a flow chart showing a control in the second aspect of performance of the present invention;

DETAILED DESCRIPTION OF THE PREFERRED EMBODIMENTS

Now, the aspects of performance of the present invention will be described in detail with reference to the drawings.

Figure 1B:
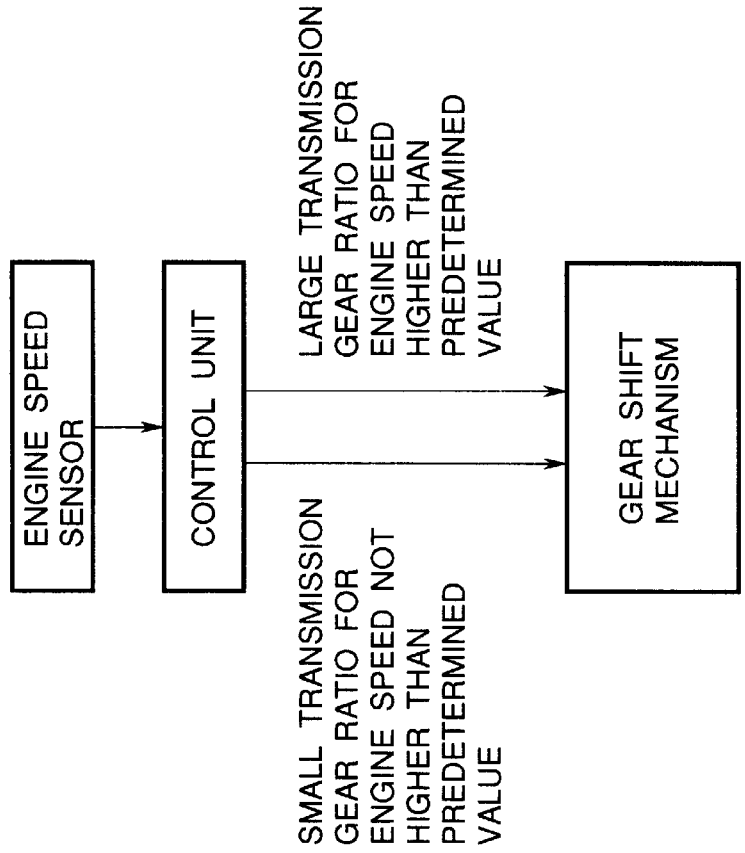
FIGS. 1A and 1B are block diagrams each showing the gist of the present invention.
Figure 1A:
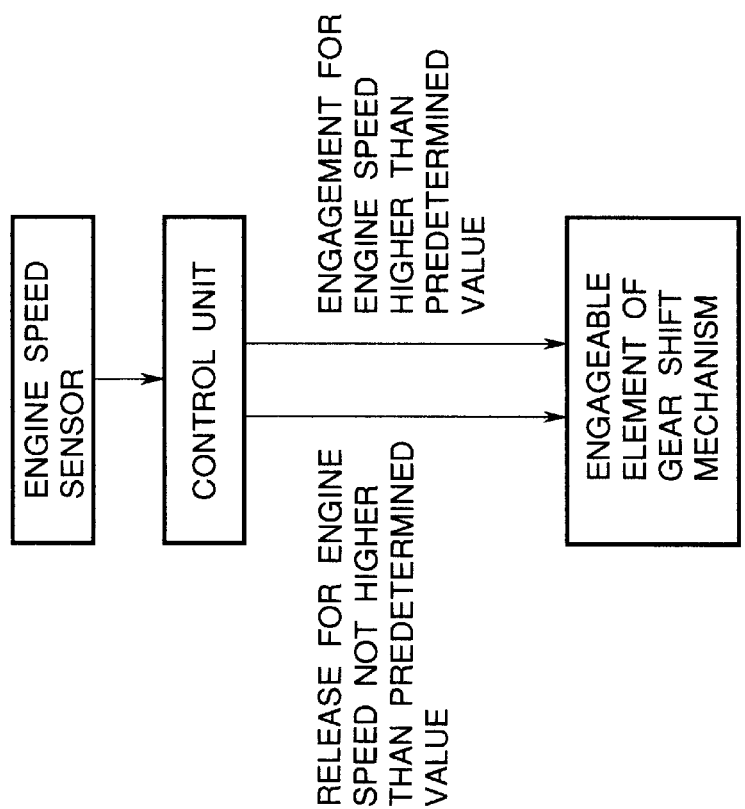
Figure 2:
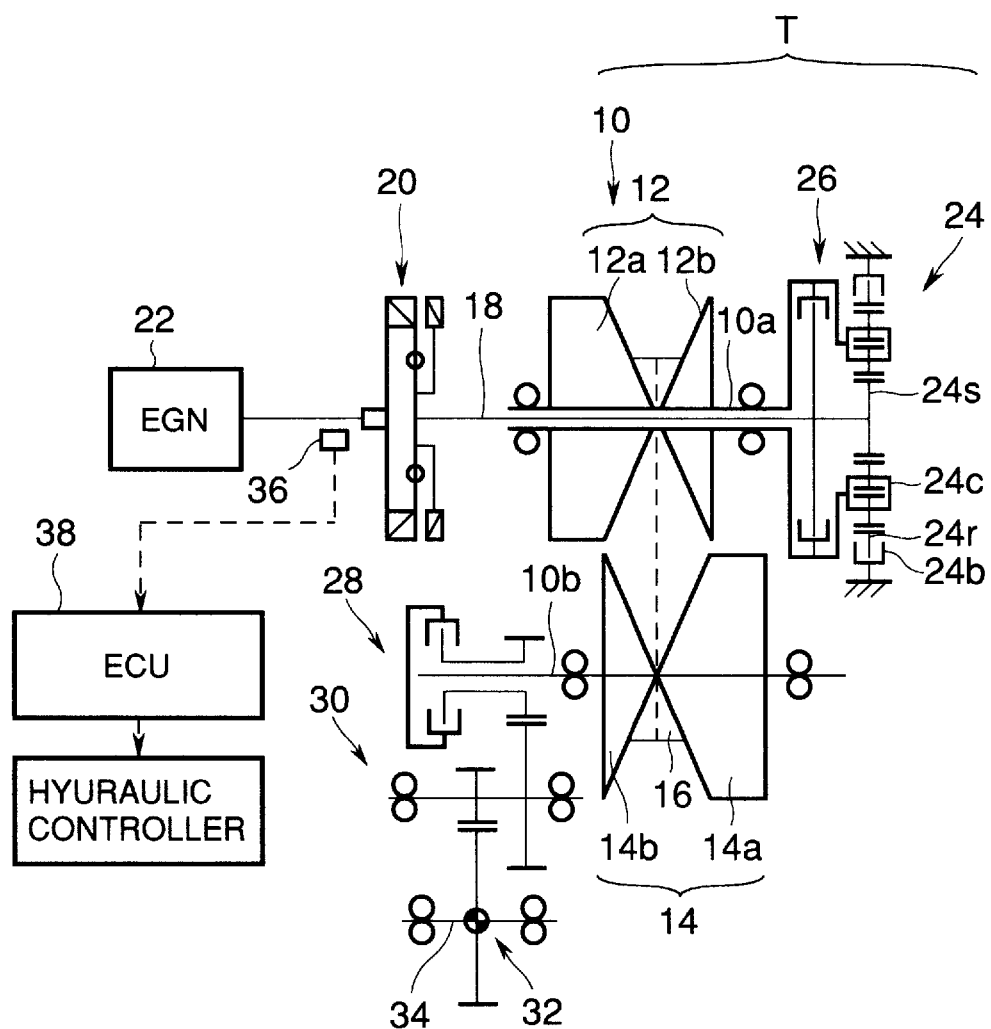
FIG. 2 is a skeleton diagram schematically showing the control system of an automatic transmission according to the present invention.

FIG. 2 is a skeleton diagram schematically showing the control system of an automatic transmission for a motor vehicle according to the present invention.

The automatic transmission includes, as its gear shift mechanism or transmission gear mechanism T, planetary gears 24 for switching the forward/reverse movements of the motor vehicle, a clutch 26 for the forward movement, and a stepless transmission device 10. The input shaft 18 of the gear shift mechanism T has a flywheel damper ("damper" termed in claim 1) 20, and transmits the rotation of an engine 22 to the forward/reverse switching planetary gears 24.

The forward/reverse switching planetary gears 24 are constructed as a so-called "double planetary type", and include a sun gear 24s, carriers 24c and a ring gear 24r. The sun gear 24s is joined to the input shaft 18. Each of the carriers 24c is joined to the input portion 10a of the stepless transmission device 10, and is also joined to the input shaft 18 through the forward clutch 26. In addition, the ring gear 24r is joined to a brake 24b for the reverse movement.

A starting clutch 28 is mounted on that output portion 10b of the stepless transmission device 10 which corresponds to the output shaft of the gear shift mechanism T. Thus, power is transmitted to an axle shaft 34 through a reduction gear portion 30 as well as a differential gear 32.

The rotation (r.p.m.) of the engine 22 is detected by an engine speed sensor (engine speed detection means) 36. The signal of the engine speed sensor 36 is input to an electronic control unit (ECU) 38.

The stepless transmission device 10 includes a primary pulley 12, a secondary pulley 14, and an endless belt of V-shaped section 16.

The primary pulley 12 (or the secondary pulley 14) is constructed of a movable-side half body 12a (or 14a) being movable in the axial direction thereof, and a stationary-side half body 12b (or 14b). When the movable-side half bodies 12a and 14a are moved axially, the radii of gyrations of those parts of the endless belt 16 which are respectively wound round the primary pulley 12 and secondary pulley 14 vary, to change the transmission gear ratio of the stepless transmission device 10. As a result, also the transmission gear ratio of the gear shift mechanism T including the stepless transmission device 10 changes.

The engagements/releases of the clutches such as forward clutch 26 and starting clutch 28, and the axial movements of the movable-side half bodies 12a and 14a to are controlled by fluid pressures. The fluid pressures are controlled by a hydraulic controller (control means) 40 which is, in turn, controlled by the electronic control unit 38.

Figure 3:
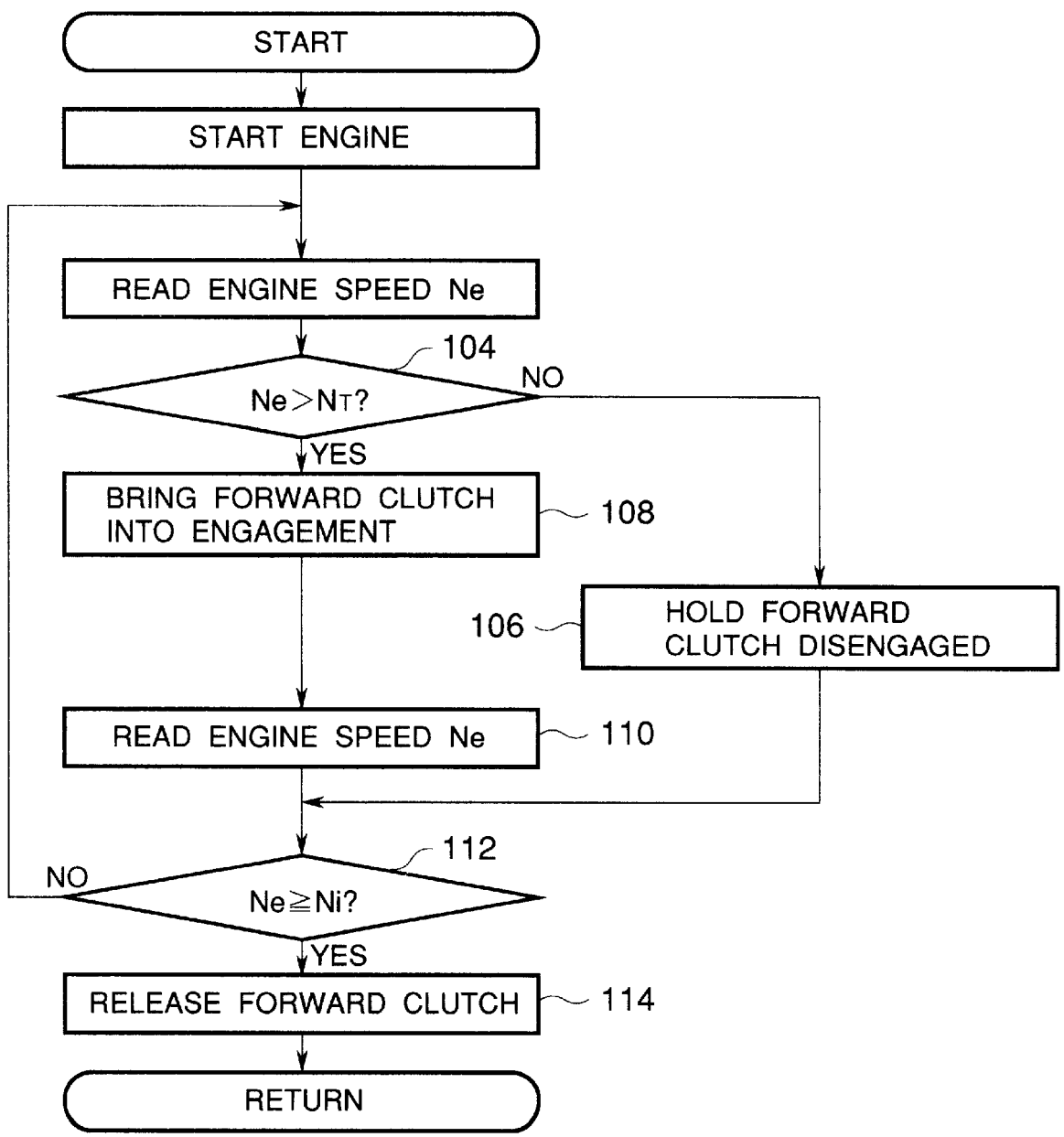
FIG. 3 is a flow chart showing a control in the first aspect of performance of the present invention.
Figure 4:
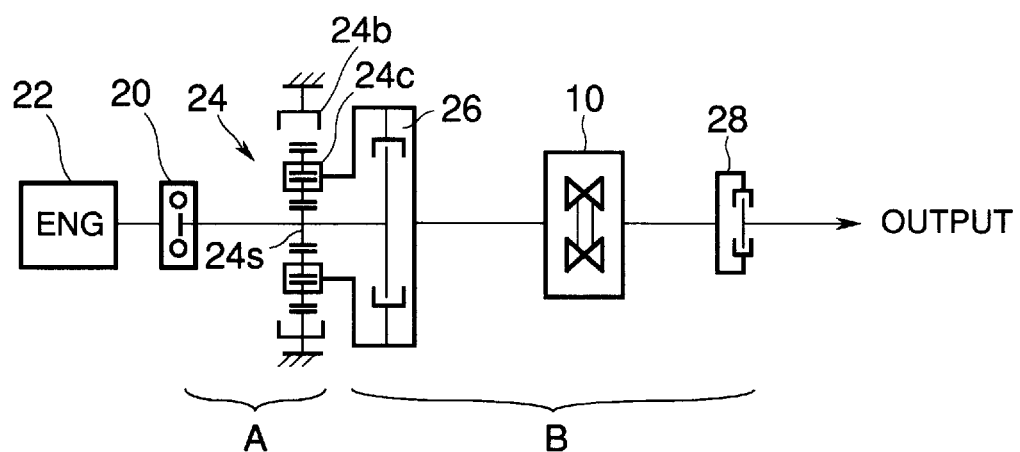
FIG. 4 is a model diagram of the automatic transmission depicted in FIG. 2.
Figure 5:
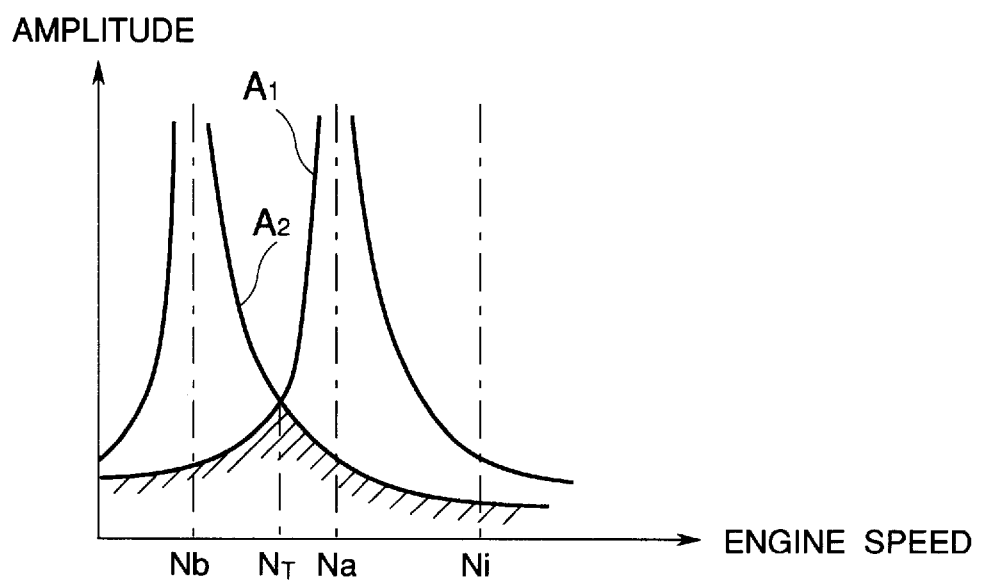
FIG. 5 is a graph showing the relationship between an engine speed and a vibrational amplitude in the first aspect of performance.
Figure 6:
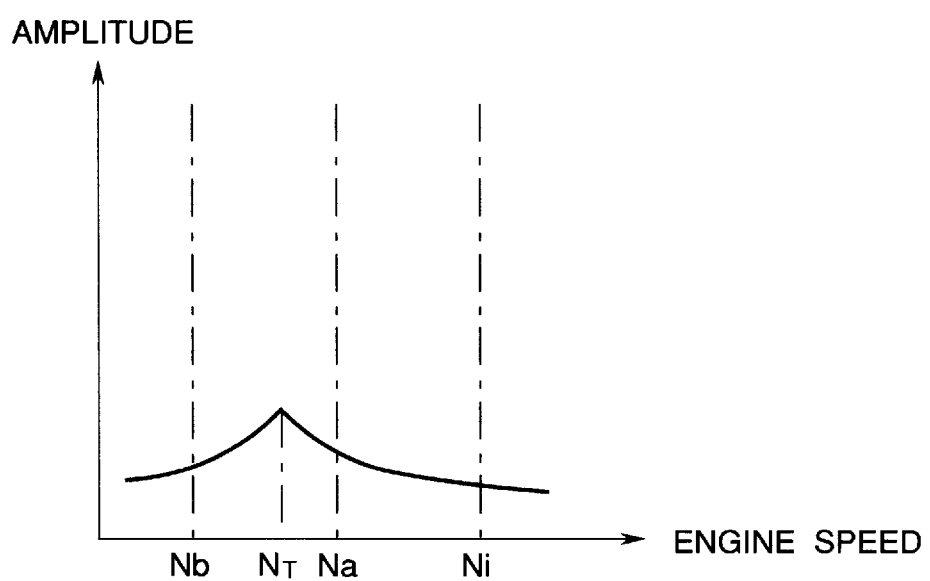
FIG. 6 is a graph showing the relationship between an engine speed and a vibrational amplitude in the first aspect of performance, similarly to FIG. 5.

Next, the operation of the first aspect of performance of the present invention will be described with reference to FIGS. 3 thru 6. FIG. 3 is a flow chart which shows a control based on the first aspect of performance, while FIG. 4 is a model diagram in which the automatic transmission illustrated in FIG. 2 is simplified for elucidating an inertial mass. In addition, FIGS. 5 and 6 are graphs each of which illustrates the relationship between the rotational speed of the engine 22 and the amplitude of the vibration of a system including the flywheel damper 20.

The first aspect of performance is intended to alter the resonance point of the system including the flywheel damper 20, in such a way that the forward clutch (engageable element) 26 of the gear shift mechanism T is engaged/released, thereby to alter the inertial mass downstream of the flywheel damper 20.

At a step 100 in FIG. 3, the engine 22 is started. At the next step 102, the engine speed Ne is read from the engine speed sensor 36. Whether or not the read engine speed Ne is greater than a predetermined value $N_T$, is decided (or judged) at a step 104.

Immediately after the start of the engine 22, the engine speed Ne is not greater than the predetermined value $N_T$ yet, and hence, the decisional result of the step 104 is "No". Accordingly, the control flow of FIG. 3 proceeds to a step 106, at which the forward clutch 26 is held in a disengaged (or released) state. More specifically, referring to the model diagram of FIG. 4, the forward clutch 26 is held disengaged, so that only the members at a part indicated by letter A, from the flywheel damper 20 to the sun gear 24s, are caused to act as the inertial mass downstream of the flywheel damper 20. On this occasion, the relationship between the engine speed Ne and the amplitude of the vibration of the "system including the flywheel damper 20" becomes as shown by a graphical characteristic of two-dot chain lines A1 in FIG. 5, and the resonance point (resonance frequency) of the system lies at a value Na.

Incidentally, symbol Ni denotes the idling speed of the engine 22.

On condition that the engine speed Ne has become greater than the predetermined value $N_T$ as the decision of the step 104, the control flow proceeds to a step 108, at which the forward clutch 26 is brought into engagement. Herein, the forward clutch 26 is engaged so that the members at a part indicated by letter B in the model diagram of FIG. 4, from the clutch 26 to the starting clutch 28, are also driven. Accordingly, both the parts A and B indicated in FIG. 4 are caused to act as the inertial mass downstream of the flywheel damper 20. On this occasion, the relationship between the engine speed Ne and the amplitude of the vibration of the system including the flywheel damper 20 becomes as shown by a graphical characteristic of solid lines A2 in FIG. 5, and the resonance point of the system changes to lie at a value Nb. In this manner, owing to the engagement of the forward clutch 26, the inertial mass downstream of the flywheel damper 20 changes, and the resonance point lowers from the value Na to the value Nb.

Subsequently, the engine speed Ne is read again at a step 110, and it is compared with the idling speed Ni at a step 112. When the engine speed Ne has not reached the idling speed Ni yet, the control flow returns to the step 102, and the above processing is iterated. On the other hand, when the engine speed Ne has reached the idling speed Ni, the control flow proceeds to a step 114, at which the forward clutch 26 is turned OFF or released. Then, the processing in the engine starting operation of the motor vehicle is ended.

In this manner, according to the first aspect of performance, while the engine speed Ne is low, the forward clutch 26 is held disengaged to set the resonance point at the high speed Na as indicated by the graphical characteristic A1 in FIG. 5, and when the engine speed Ne has become higher than the predetermined-speed $N_T$, the forward clutch 26 is brought into engagement to alter the resonance point to the low speed Nb as indicated by the graphical characteristic A2. Namely, as illustrated in FIG. 6, the intersection point between the graphical characteristics A1 and A2 is set as the predetermined value $N_T$, so that the amplitude of the vibration of the rotary system is changed in the combined shape of the two graphical characteristics A1 and A2 with the predetermined value $N_T$ as a boundary. As a result, even when the engine speed Ne has changed from the low speed to the high speed, the vibration of large amplitude attributed to the resonance of the system including the flywheel damper 20 can be prevented from occurring.

By the way, in this aspect of performance, the forward clutch 26 is engaged/released in order to alter the inertial mass downstream of the flywheel damper 20. It is also allowed, however, to engage/release the reverse brake 24b (shown in FIGS. 2 and 4) instead of the forward clutch 26. More specifically, while the engine speed Ne is low, the reverse brake 24b is held disengaged (released). Thereafter, when the engine speed Ne has heightened, the reverse brake 24b is brought into engagement. Then, the part B in FIG. 4 including the stepless transmission device 10, etc. is also driven through the carriers 24c likewise to the foregoing case of the engagement of the forward clutch 26, and an effect substantially similar to that of the foregoing case can be achieved.

Now, the second aspect of performance of the present invention will be described.

FIG. 7 is a flow chart which shows a control based on the second aspect of performance.

The second aspect of performance is intended to alter the resonance point of the system including the flywheel damper 20, in such a way that the transmission gear ratio of the stepless transmission device 10 of the gear shift mechanism T is changed, thereby to alter the shaft-calculated inertial mass $I_1$ (calculated in terms of the inertial mass of the input shaft 18 of the gear shift mechanism T) downstream of the flywheel damper 20.

Figure 8A:
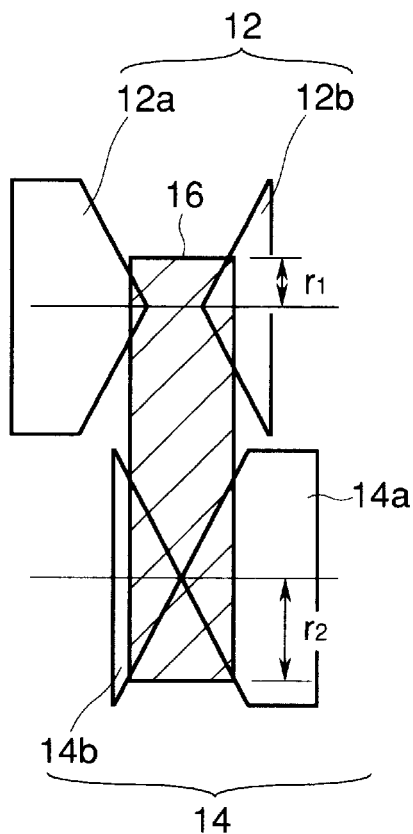
FIGS. 8A and 8B are explanatory diagrams for clarifying the alteration of the transmission gear ratio of a stepless transmission device.

The transmission gear ratio of the stepless transmission device 10 is given by a ratio r1/r2 where symbols r1 and r2 denote the radii of those parts of the endless belt 16 which are wound round the primary pulley 12 and secondary pulley 14, respectively, as shown in FIG. 8A. Besides, letting symbol $I_{out}$ denote the inertial mass on the side of the output portion 10b of the stepless transmission device 10, the shaft-calculated inertial mass $I_0$ at the input portion 10a of the stepless transmission device 10 is given by the following equation (1):

$$I_0 = I_{out} \times (r1/r2)^2 \quad (1)$$

Figure 8B:
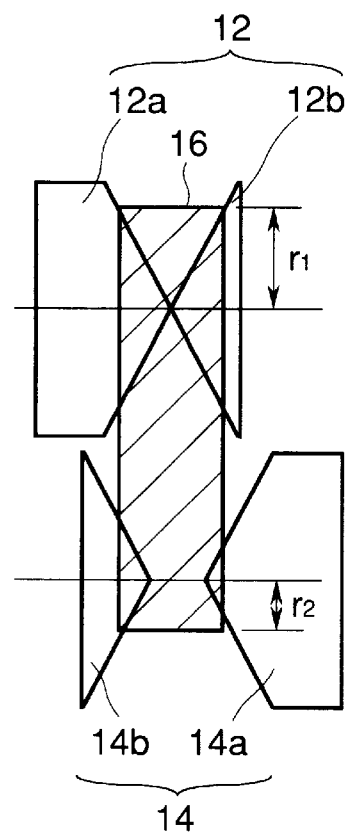

Here, the shaft-calculated inertial mass $I_0$ at the input portion 10a of the stepless transmission device 10 can be altered in such a way that the movable-side half bodies 12a and 14a are axially moved, thereby to change the radii r1 and r2, and accordingly to change the transmission gear ratio as illustrated in FIG. 8B. The transmission gear ratio becomes smaller as the radius r1 is set smaller and the radius r2 larger, whereas the transmission gear ratio becomes larger as the radius r1 is set larger and the radius r2 smaller. The shaft-calculated inertial mass $I_1$ downstream of the flywheel damper 20 can be changed by changing the shaft-calculated inertial mass $I_0$ at the input portion 10a of the stepless transmission device 10.

Figure 9:
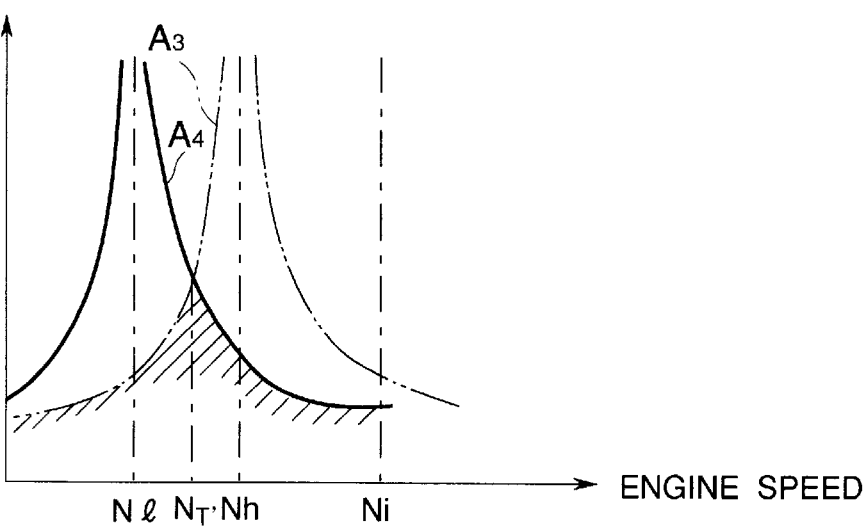
FIG. 9 is a graph showing the relationship between an engine speed and a vibrational amplitude in the second aspect of performance.

FIG. 9 illustrates the relationship between the engine speed Ne and the amplitude of the vibration of the system including the flywheel damper 20. A graphical characteristic of two-dot chain lines A3 corresponds to the case where the transmission gear ratio is small (where the shaft-calculated inertial mass $I_1$ is small), and symbol Nh denotes the resonance point of the damper system in this case. On the other hand, a graphical characteristic of solid lines A4 corresponds to the case where the transmission gear ratio is large (where the shaft-calculated inertial mass $I_1$ is large), and symbol Nl denotes the resonance point of the damper system in this case. Besides, symbol Ni denotes the idling speed of the engine-22 as in FIG. 5. The qualitative tendency of the graph in FIG. 9 is substantially the same as that of the graph in FIG. 5. It is accordingly understood that the effect of the present invention can be similarly attained by utilizing the tendency of the graph in FIG. 9.

Now, the operation of this aspect of performance will be described in detail with reference to the flow chart of FIG. 7.

At a step 200 in FIG. 7, the engine 22 is started. The forward clutch 26 is brought into engagement at a step 202, and the engine speed Ne is read at a step 204. On this occasion, the stepless transmission device 10 is in the state of the small transmission gear ratio as shown in FIG. 8A.

Whether or not the engine speed Ne is greater than a predetermined value, is decided (or judged) at the next step 206. As the predetermined value, for example, the resonance point Nl in the case of the large transmission gear ratio as indicated in FIG. 9 is used. Here in the second aspect of performance, the intersection point $N_T'$ between the graphical characteristic A3 correspondent to the small transmission gear ratio and the graphical characteristic A4 correspondent to the large transmission gear ratio, similar to the intersection point $N_T$ in the first aspect of performance, is not used as the predetermined value. In the first aspect of performance, the inertial mass is altered by engaging the forward clutch 26, so that a time period for altering the resonance point can be set very short. In contrast, in the second aspect of performance, the transmission gear ratio is altered by shifting the novable-side half bodies 12a and 14a of the stepless transmission device 10 as illustrated in FIGS. 8A and 8B, so that a rather large time period is expended on the alteration of the resonance point. Therefore, the earlier value Nl is used as the threshold value.

In a case where, as the decision of the step 206, the engine speed Ne is not greater than the predetermined value (for example, the resonance point Nl correspondent to the large transmission gear ratio) yet, the transmission gear ratio is held small at a step 208, followed by a step 214.

On the other hand, in a case where the engine speed Ne has exceeded the predetermined value Nl, the control flow of FIG. 7 proceeds to a step 210, at which the stepless transmission device 10 is controlled so as to enlarge the transmission gear ratio. Thus, as seen from FIG. 9, the resonance point Nh having been held till then is altered to the resonance point Nl of smaller value. In this case, the transmission gear ratio is controlled so that the resonance point Nh or Nl may come to a position which is distant from the engine speed Ne to the utmost. Since, however, the alteration from the resonance point Nh to the resonance point Nl is made continuously (not stepwise) in accordance with the transmission gear ratio, the engine speed Ne rises on and on while inevitably passing through the changing resonance points once. It is accordingly thought that, in actuality, the transmission gear ratio should preferably be altered fastest in many cases.

Thereafter, the engine speed Ne is read at a step 212. Further, whether or not the engine speed Ne has reached the idling speed Ni is decided at the step 214. In a case where it has not reached the idling speed Ni, the control flow returns to the step 202, and the above processing is iterated.

When the engine speed Ne has reached the idling speed Ni, the stepless transmission device 10 is controlled so as to make the transmission ratio small at the next step 216. Besides, the forward clutch 26 is released at a step 218. Then, the processing in the engine starting operation of the motor vehicle is ended.

Figure 10:
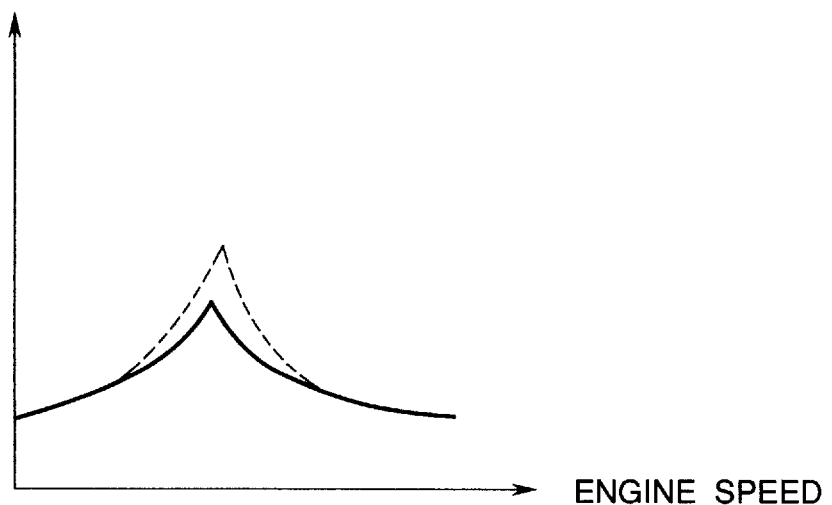
FIG. 10 is a graph showing the relationship between an engine speed and a vibrational amplitude in the second aspect of performance, similarly to FIG. 9.

In this aspect of performance, the automatic transmission is controlled so as to hold the transmission gear ratio small in the case of the low engine speed Ne and to enlarge the transmission gear ratio in the case of the high engine speed Ne. That is, the graphical characteristic A3 shown in FIG. 9 is used in the case where the engine speed Ne is low, and the graphical characteristic A4 is used in the case where it is high. Ultimately, the amplitude of the vibration of the system including the flywheel damper 20 is changed in accordance with a graphical characteristic of solid line indicated in FIG. 10, thereby to prevent the resonance of the damper system from occurring.

As stated before, in the second aspect of performance, the alteration of the resonance point is incarnated by the alteration of the transmission gear ratio, and it is not made stepwise. In fact, therefore, the vibrational amplitude changes as indicated by a broken line in FIG. 10. Such an amplitude, however, has almost no influence from the viewpoint of the prevention of the resonance.

In this manner, according to the second aspect of performance, the shaft-calculated inertial mass $I_1$ downstream of the damper 20 is altered in dependency on the engine speed Ne, so as to alter the resonance point from the value Nh to the value Nl, whereby the occurrence of the resonance can be prevented to suppress the appearance of the vibration of large amplitude.

Incidentally, in this aspect of performance, although the gear shift mechanism T includes the stepless transmission device 10, the present invention is not restricted thereto. The stepless transmission device 10 may well be replaced with a different transmission device such as twin clutches with parallel gears. It is to be understood that a similar effect is attained even when the transmission gear ratio is altered in dependency on the engine speed by the different transmission device.

Herein, for example, in a case where the gear shift mechanism is a step-type one the transmission gear ratio of which is altered by the engagement or release of an engageable element, the alteration of the resonance point can be made more stepwise (more quickly), and hence, the resonance may possibly be suppressed more.

Besides, in a case where the transmission gear ratio can be altered from a small one to a large one by "release" (not engagement) of an engageable element owing to the gearing construction of a gear shift mechanism employed, the resonance point can be altered still more stepwise, and hence, the resonance may possibly be suppressed still more.

By the way, the present invention can be performed by combining the first and second aspects of performance. In this case, versatility in the choice of resonance points can be expanded more. Further, when each predetermined value for each changeover is set by way of example, the engine speed at the current time and the resonance point at the same can be always kept in the relationship of being distant to the utmost.

In addition, according to each of the two aspects of performance stated above, any element for attenuating a viscosity, or the like is not required. Therefore, the transmission efficiency of the automatic transmission is enhanced, and the weight thereof can be lightened. Moreover, owing to the enhanced performance of the flywheel damper 20, the starting clutch 28 can be engaged in the still lower speed zone of the engine 22, so that the fuel consumption and starting performance of the motor vehicle are enhanced. Furthermore, the on-vehicle mounting quality of the automatic transmission is enhanced owing to reduction in the size of the flywheel damper 20.

As described above, according to the present invention, the resonance point of a system including a damper is altered in dependency on an engine speed, thereby to prevent the resonance of the damper system from occurring, so that the appearance of a vibration of large amplitude can be suppressed in spite of permitting a starting clutch to be engaged in the low speed zone of an engine.

What is claimed is:

1. A control system of an automatic transmission wherein power delivered from an engine is transmitted to a gear shift mechanism through a damper, and the power is transmitted from the gear shift mechanism to driving wheels through a starting clutch, comprising:

an engine speed sensor for detecting an engine speed; and a control unit for controlling an engagement state of an engageable element of said gear shift mechanism on the basis of the engine speed in an engine starting operation, thereby to alter an inertial mass downstream of said damper in dependence on said engine speed;

said control unit releasing the engageable element of said gear shift mechanism when said engine speed is not higher than a predetermined value, and bringing said engageable element of said gear shift mechanism into engagement when said engine speed is higher than the predetermined value, so as to suppress occurrence of resonance of said damper.

2. A control system of an automatic transmission as defined in claim 1, wherein said engageable element of said gear shift mechanism is a clutch for a forward movement of an motor vehicle.

3. A control system of an automatic transmission as defined in claim 1, wherein said engageable element of said gear shift mechanism is a brake for a reverse movement of an motor vehicle.

* * * * *